United States Patent
Sato et al.

(10) Patent No.: US 7,709,130 B2
(45) Date of Patent: May 4, 2010

(54) FUEL CELL

(75) Inventors: Yuusuke Sato, Tokyo (JP); Koichiro Kawano, Kamakura (JP); Ryosuke Yagi, Kawasaki (JP); Masato Akita, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 101 days.

(21) Appl. No.: 12/049,695

(22) Filed: Mar. 17, 2008

(65) Prior Publication Data

US 2008/0241635 A1 Oct. 2, 2008

(30) Foreign Application Priority Data

Mar. 26, 2007 (JP) .......................... P2007-080315
Sep. 19, 2007 (JP) .......................... P2007-242403

(51) Int. Cl.
*H01M 2/00* (2006.01)
*H01M 2/02* (2006.01)

(52) U.S. Cl. .............................. 429/34; 429/12; 429/13

(58) Field of Classification Search .................. 429/12, 429/13, 34
See application file for complete search history.

(56) References Cited

U.S. PATENT DOCUMENTS

| | | | |
|---|---|---|---|
| 6,924,055 B2 | 8/2005 | Hirsch et al. | |
| 6,981,877 B2 | 1/2006 | Ren et al. | |
| 2004/0258975 A1 * | 12/2004 | Extrand et al. | 429/34 |
| 2005/0164069 A1 * | 7/2005 | Margiott et al. | 429/38 |
| 2006/0292412 A1 * | 12/2006 | Faghri et al. | 429/26 |
| 2007/0148512 A1 * | 6/2007 | Goto et al. | 429/23 |
| 2007/0231657 A1 | 10/2007 | Sato et al. | |

FOREIGN PATENT DOCUMENTS

| | | | |
|---|---|---|---|
| CN | 1610155 A | | 4/2005 |
| CN | 1776942 A | | 5/2006 |
| GB | 1143350 | * | 2/1969 |
| JP | 2002-175817 | | 6/2002 |
| JP | 2006-49115 | | 2/2006 |

OTHER PUBLICATIONS

U.S. Appl. No. 12/049,740, filed Mar. 17, 2008, Kawano, et al.
U.S. Appl. No. 12/054,889, filed Mar. 25, 2008, Sato, et al.
U.S. Appl. No. 12/207,662, filed Sep. 10, 2008, Sato, et al.
U.S. Appl. No. 12/207,776, filed Sep. 10, 2008, Sato.

* cited by examiner

*Primary Examiner*—Jerry Lorengo
*Assistant Examiner*—Carlos Barcena
(74) *Attorney, Agent, or Firm*—Oblon, Spivak, McClelland, Maier & Neustadt, L.L.P

(57) ABSTRACT

A fuel cell include a membrane electrode assembly including an anode, a cathode opposed to the anode, and an electrolyte membrane interposed between the anode and the cathode; a lyophobic porous body in contact with the anode; and an anode passage plate in contact with the lyophobic porous body, the anode passage plate including a gas collection passage and a fuel supplying passage, the gas collection passage collects a gas generated in the anode via the lyophobic porous body, the fuel supplying passage supplies a fuel to the anode via the lyophobic porous body.

14 Claims, 12 Drawing Sheets

FUEL CELL

CROSS REFERENCE TO RELATED APPLICATIONS AND INCORPORATION BY REFERENCE

This application is based upon and claims the benefit of priority from the prior Japanese Patent Applications No. P2007-80315 filed on Mar. 26, 2007, and No. P2007-242403 filed on Sep. 19, 2007; the entire contents of which are incorporated herein by reference.

BACKGROUND OF THE INVENTION

1. Field of the Invention

The present invention relates to a fuel cell.

2. Description of the Related Art

A direct fuel cell that directly supplies liquid fuel, such as alcohol, to a fuel cell stack does not require an auxiliary machine such as a vaporizer, a reformer, and the like. Therefore, miniaturized batteries used for portable electronic equipment has been expected. In such a known direct fuel cell, such as a circulation-type fuel cell system, an alcohol solution is directly supplied to the fuel cell stack. In operation, protons are extracted, exhaust materials, such as water exhausted from the fuel cell stack, are circulated to a mixing tank which is provided on an upstream side of the fuel cell stack.

A direct methanol fuel cell (DMFC) has the fuel cell stack in which generator cells each including an anode, a cathode and a membrane electrode assembly (MEA) are stacked one on another. In each generator cell, a mixed solution of water and methanol is supplied to the anode via a liquid feed pump or the like, and thus reacts as expressed in the following chemical formula (1). As a result, carbon dioxide is produced. Air is supplied to the cathode via a pneumatic feed pump or the like, and thus reacts as expressed in the following chemical formula (2). As a result, water is produced.

$$CH_3OH+H_2O \rightarrow CO_2+6H^++6e^- \quad (1)$$

$$3/2O_2+6H^++6e^- \rightarrow 3H_2O \quad (2)$$

A mixed solution containing water, unreacted methanol and carbon dioxide which has been produced at the anode is discharged from the anode as a gas-liquid two-phase flow. The gas-liquid two-phase flow is separated into a gas and a liquid by a gas-liquid separator provided in an outlet side of a passage of the anode. Separated liquid is circulated to a mixing tank or the like via a collection passage, whereas separated gas is emitted to the atmosphere.

However, the gas-liquid two-phase flow increases the pressure loss in the anode passage when the gas-liquid two-phase flow passes through the anode passage and the outlet side of the passage of the anode. In addition, since the arrangement of the gas-liquid separator increases the anode circulation section in size, it makes it difficult to construct the generator cell in a compact size.

SUMMARY OF THE INVENTION

An aspect of the present invention inheres in a fuel cell encompassing a membrane electrode assembly including an anode, a cathode opposed to the anode, and an electrolyte membrane interposed between the anode and the cathode; a lyophobic porous body in contact with the anode; and an anode passage plate in contact with the lyophobic porous body, the anode passage plate including a gas collection passage and a fuel supplying passage, the gas collection passage collects a gas generated in the anode via the lyophobic porous body, the fuel supplying passage supplies a fuel to the anode via the lyophobic porous body.

Another aspect of the present invention inheres in a fuel cell encompassing a membrane electrode assembly including an anode, a cathode opposed to the anode, and an electrolyte membrane interposed between the anode and the cathode; a lyophilic porous body in contact with the anode; and an anode passage plate in contact with the lyophilic porous body, the anode passage plate including a gas collection passage and a fuel supplying passage, the gas collection passage collects a gas generated in the anode via the lyophilic porous body, the fuel supplying passage supplies a fuel to the anode via the lyophilic porous body.

DETAILED DESCRIPTION OF THE INVENTION

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. In the following descriptions, numerous details are set forth such as specific signal values, etc. to provide a thorough understanding of the present invention. However, it will be obvious to those skilled in the art that the present invention may be practiced without such specific details.

First Embodiment

Figure 1:
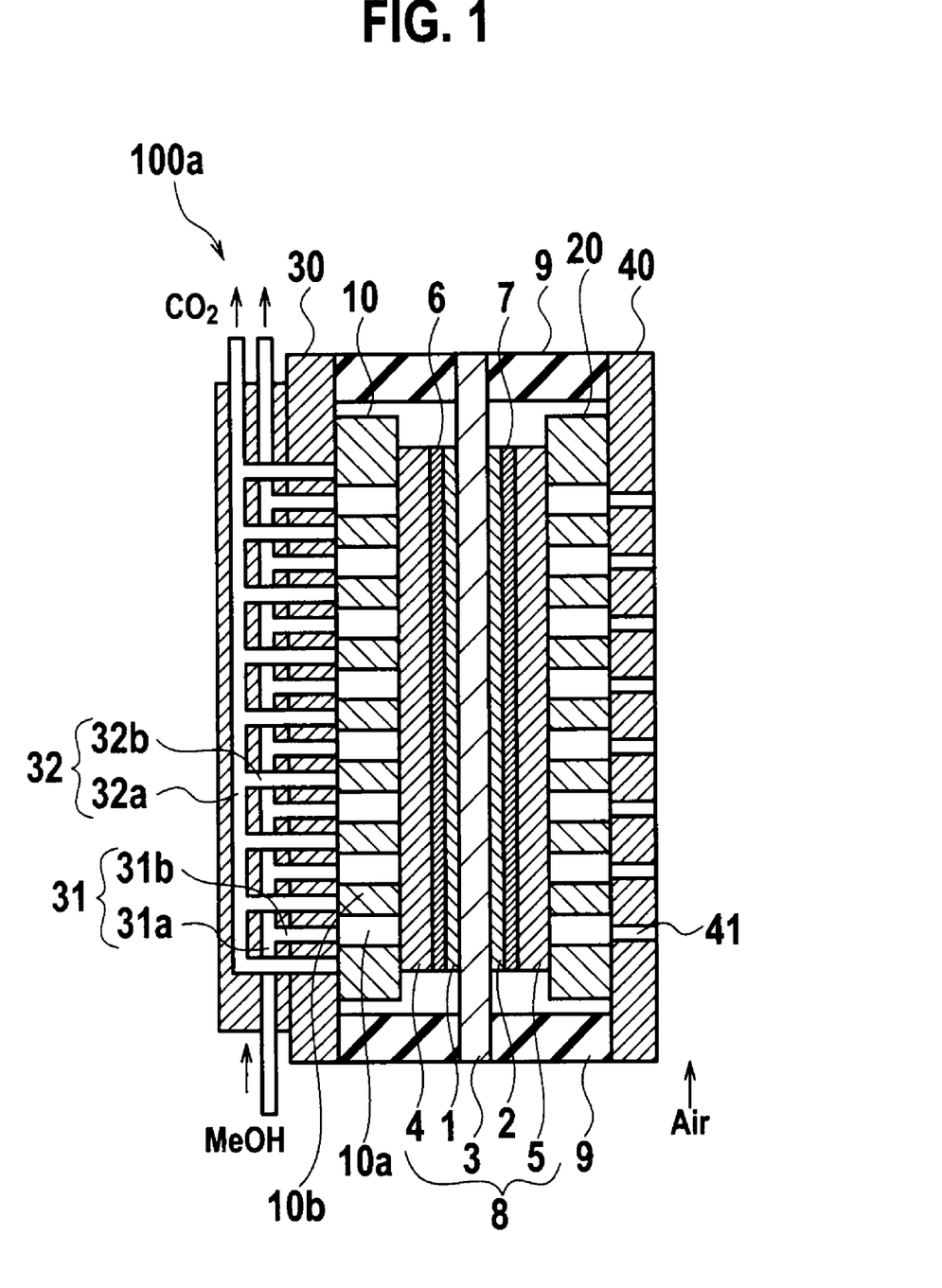
FIG. 1 is a sectional view illustrating an example of the fuel cell according to a first embodiment.

As shown in FIG. 1, a fuel cell according to a first embodiment includes a membrane electrode assembly (MEA) 8 including an anode (an anode catalyst layer 1 and an anode gas diffusion layer 4) and a cathode (a cathode catalyst layer 2 and a cathode gas diffusion layer 5) opposed to the anode and an electrolyte membrane 3 interposed therebetween. The fuel cell further includes a lyophobic porous body 10 which is in contact with the anode gas diffusion layer 4 having through-holes 10a, an anode passage plate 30 in contact with the lyophobic porous body 10, and a cathode passage plate 40 opposed to the anode passage plate 30 with the cathode gas diffusion layer 5 interposed in between. The anode passage plate 30 and the cathode passage plate 40 seal the periphery of the MEA with gaskets 9 interposed in between at their opposite ends.

The MEA 8 includes the electrolyte membrane 3, the anode catalyst layer 1, the cathode catalyst layer 2, the anode gas diffusion layer 4, and the cathode gas diffusion layer 5. The electrolyte membrane 3 is made of a proton-conductive solid polymer membrane or the like. The anode catalyst layer 1 and the cathode catalyst layer 2 are formed by applying a catalyst on the respective surfaces of the electrolyte membrane 3. The anode gas diffusion layer 4 and the cathode gas diffusion layer 5 are formed on the external sides of the anode catalyst layer 1 and the cathode catalyst layer 2, respectively.

A Nafion film (registered trademark of Dupont), which is copolymer between tetrafluoroethylene and perfluoro-vinyl ether sulfonate may be used for the electrolyte membrane 3. Ruthenium-platinum may be used for the anode catalyst layer 1. Platinum or the like may be used for the cathode catalyst layer 2. A porous carbon paper and the like may be used for the anode gas diffusion layer 4 and the cathode gas diffusion layer 5.

A carbon-made, water-repellent treated anode micro-porous layer 6 with a thickness of tens microns may be arranged between the anode catalyst layer 1 and the cathode gas diffusion layer 4. The anode micro-porous layer 6 has pores each with a pore size of submicrons. A carbon-made cathode micro-porous layer 7 with a thickness of tens of microns may be arranged between the cathode catalyst layer 2 and the cathode gas diffusion layer 5. The cathode micro-porous layer 7 has pores each with a pore size of submicrons.

Figure 2:
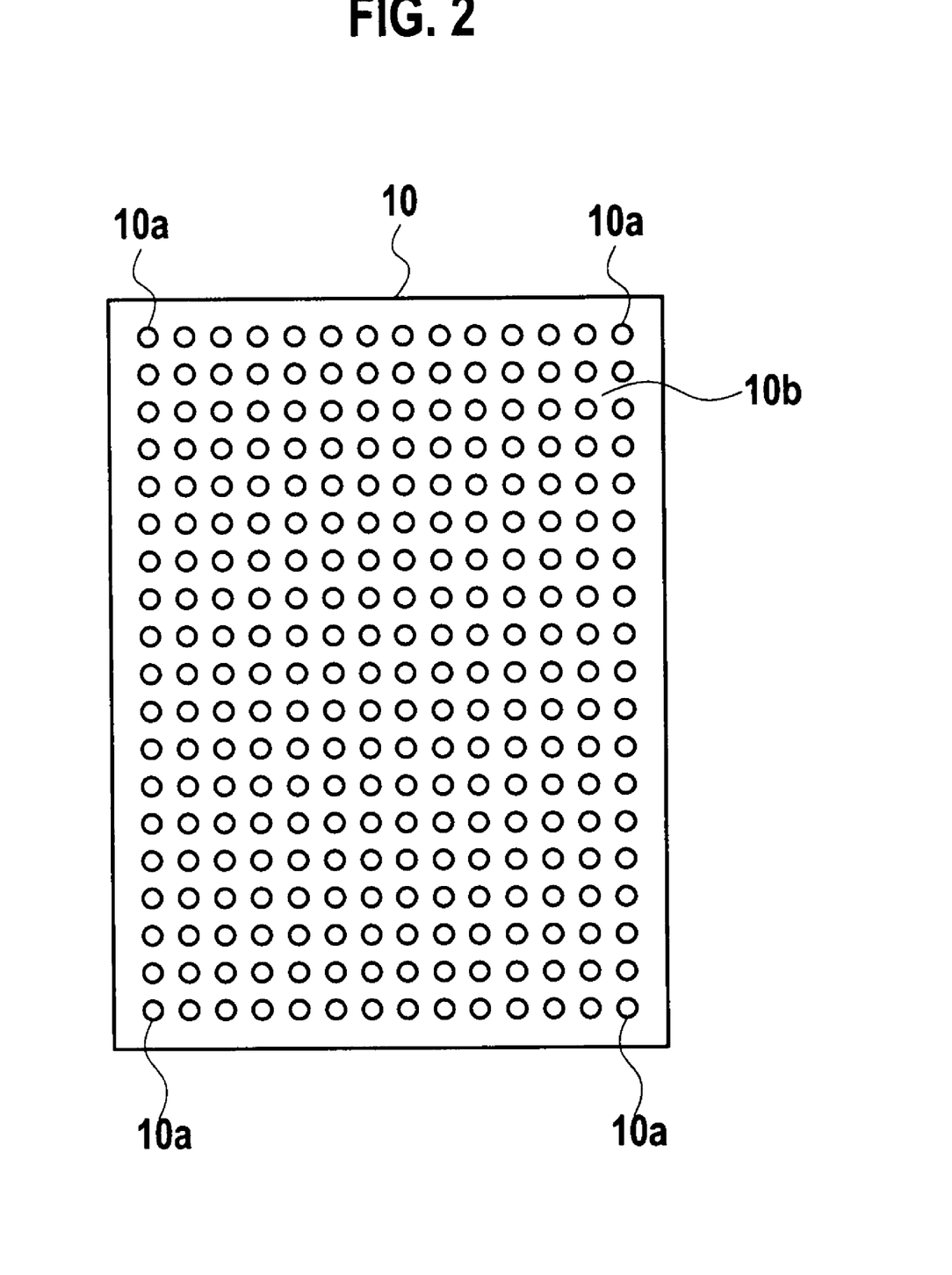
FIG. 2 is a plane view illustrating an example of a lyophobic porous body according to the first embodiment.

The lyophobic porous body 10 includes multiple through-holes 10a penetrating the lyophobic porous body 10 between a surface contacting the anode gas diffusion layer 4 and a surface contacting the anode passage plate 30. As shown in FIG. 2, the through-holes 10a are opened in a tessellated manner throughout the sheet-shaped hydrophilic carbon porous body with a thickness of approximately 200 μm, which has pores each with a pore size of several micrometers. The through-holes 10a are sufficiently larger in diameter than the micro-pores each with the pore size of several micrometers, which constitute the lyophobic porous body 10. For example, the through-holes 10a can be set at approximately 1 mm in diameter. The pore sizes of the through-holes 10a can be changed whenever deemed necessary, depending on the passage width of the anode passage plate 30 and the like.

A carbon paper made of hydrophobically treated carbon fibers which has pores each with a pore size of several micrometers, a material obtained by hydrophobically treating a sintered metal, or an electrically-conductive lyophobic porous body material having pores each with a pore size of less than several micrometers may be used for the lyophobic porous body 10.

The anode passage plate 30 includes a fuel supplying passage 31 and a gas collection passage 32. The fuel supplying passage 31 may include: a serpentine passage section 31a shaped like a serpent, which flows a fuel, for example, in one or more passages from upstream to downstream in a meandering manner; and a supplying section 31b which branches from the serpentine passage section 31a to the anode gas diffusion layer 4, and which supplies part of the fuel flowing in the serpentine passage section 31a to the anode gas diffusion layer 4. End portions of the supplying section 31b are connected to the respective through-holes 10a in the lyophobic porous body 10.

The gas collection passage 32 includes: a serpentine passage section 32a which flows the gas, for example, in one or more passages from upstream to downstream in a meandering manner; and a collection section 32b which branches from the serpentine passage section 32a to the anode gas diffusion layer 4, and which collects gases such as $CO_2$ from the anode gas diffusion layer 4. The collection section 32b is connected to parts (for example, areas 10b in FIG. 2) of the lyophobic porous body 10 in which no through-holes 10a are formed.

The foregoing description has been provided for the purpose of showing an example of the configuration and arrangement of each of the fuel supplying passage 31 and the gas collection passage 32 shown in FIG. 1. It goes without saying that other various configurations may be adopted for the fuel supplying passage 31 and the gas collection passage 32. In addition, the lyophobic porous body 10 does not have to have the through-holes 10a. In a case where, for example, a methanol aqueous solution is used as the fuel, part of the methanol aqueous solution is supplied in the form of the liquid to the anode catalyst layer 1 via the lyophobic porous body 10 whereas the other part of the methanol aqueous solution is supplied in the form of methanol and a vapor to the anode catalyst 1 via the lyophobic porous body 10. Liquid alcohols other than methanol, hydrocarbon, ether and the like may be used as the fuel.

The cathode passage plate 40 shown in FIG. 1 includes pores 41 each for supplying air to the cathode catalyst layer 2. A porous body 20 with a moisture retention function of preventing the cathode catalyst layer 2 from drying may be provided between the cathode gas diffusion layer 5 and the cathode passage plate 40. In the case of the example shown in FIG. 1, the air is supplied to the cathode gas diffusion layer 5 by breathing. For this reason, the cathode passage plate 40 may be omitted from the fuel cell in this case. Here, "breathing" is not a method of forcedly supplying air, by use of a compressor or the like, to the passage provided in the cathode passage plate, but a method of supplying air by natural air intake.

In the case of the fuel cell 100a shown in FIG. 1, since the lyophobic porous body 10 is lyophobic, the fuel supplied through the fuel supplying passage 31 flows through the through-holes 10a without permeating into the lyophobic porous body 10. On the other hand, more of $CO_2$ which has been produced by the anode reaction, and which is subsequently brought to the anode gas diffusion layer 4, passes the lyophobic porous body 10 rather than the through-holes 10a, after $CO_2$ reaches the interface between the anode gas diffusion layer 4 and the lyophobic porous body 10. It is because $CO_2$ passes the inside of the lyophobic porous body 10 having fine pores more easily than forms bubbles after entering the liquid (fuel) filled in the through-holes 10a.

The fuel cell 100a is capable of checking $CO_2$ from flowing into the fuel supplying passage 31, and to accordingly check the gas from being mixed into the liquid at the outlet of the fuel supplying passage 31. That is because the fuel cell 100a collects $CO_2$ passing the lyophobic porous body 10 through the gas collection passage 32 connected to the lyophobic porous body 10. As a result, the fuel cell 100a is capable of checking the flow rate which would otherwise increase due to a volume expansion resulting from the formation of the gas-liquid two-phase flow inside the fuel supplying passage 31. In addition, the fuel cell 100a is capable of checking a pressure loss of the liquid which would otherwise cause due to a meniscus formation, and of accordingly reducing a pressure loss in the anode (the fuel supplying passage 31) to a large extent.

It should be noted that an amount of $CO_2$ permeating into, and flowing in, each unit area of the anode gas diffusion layer 4 is small. This makes small the pressure loss which occurs while $CO_2$ passes the lyophobic porous body 10. Moreover, the fuel cell 100a shown in FIG. 1 is capable of easily separating the $CO_2$ gas from unreacted part of the liquid fuel even if the MEA 8 is tilted to an arbitrary direction, since the lyophobic porous body 10 is arranged in the fuel cell 100a.

Second Embodiment

Figure 3:
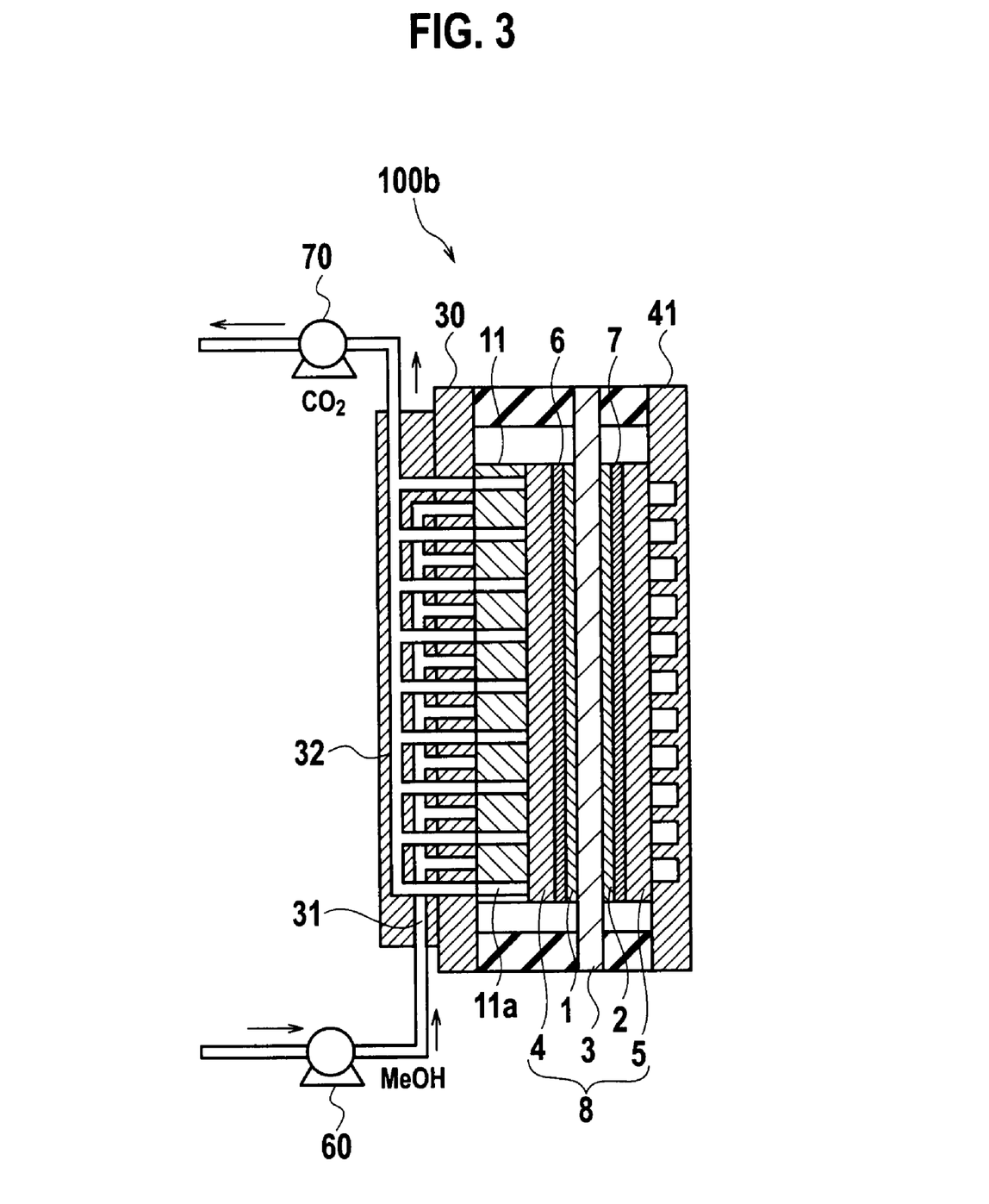
FIG. 3 is a sectional view illustrating an example of the fuel cell according to a second embodiment.

As shown in FIG. 3, a fuel cell 100b according to a second embodiment is different from the fuel cell 100a shown in FIG. 1 in that a lyophilic porous body 11 is arranged between the anode passage plate 30 and the anode gas diffusion layer 4. It should be noted that the illustration of the porous body 20 shown in FIG. 1 is omitted from FIG. 3.

Figure 4:
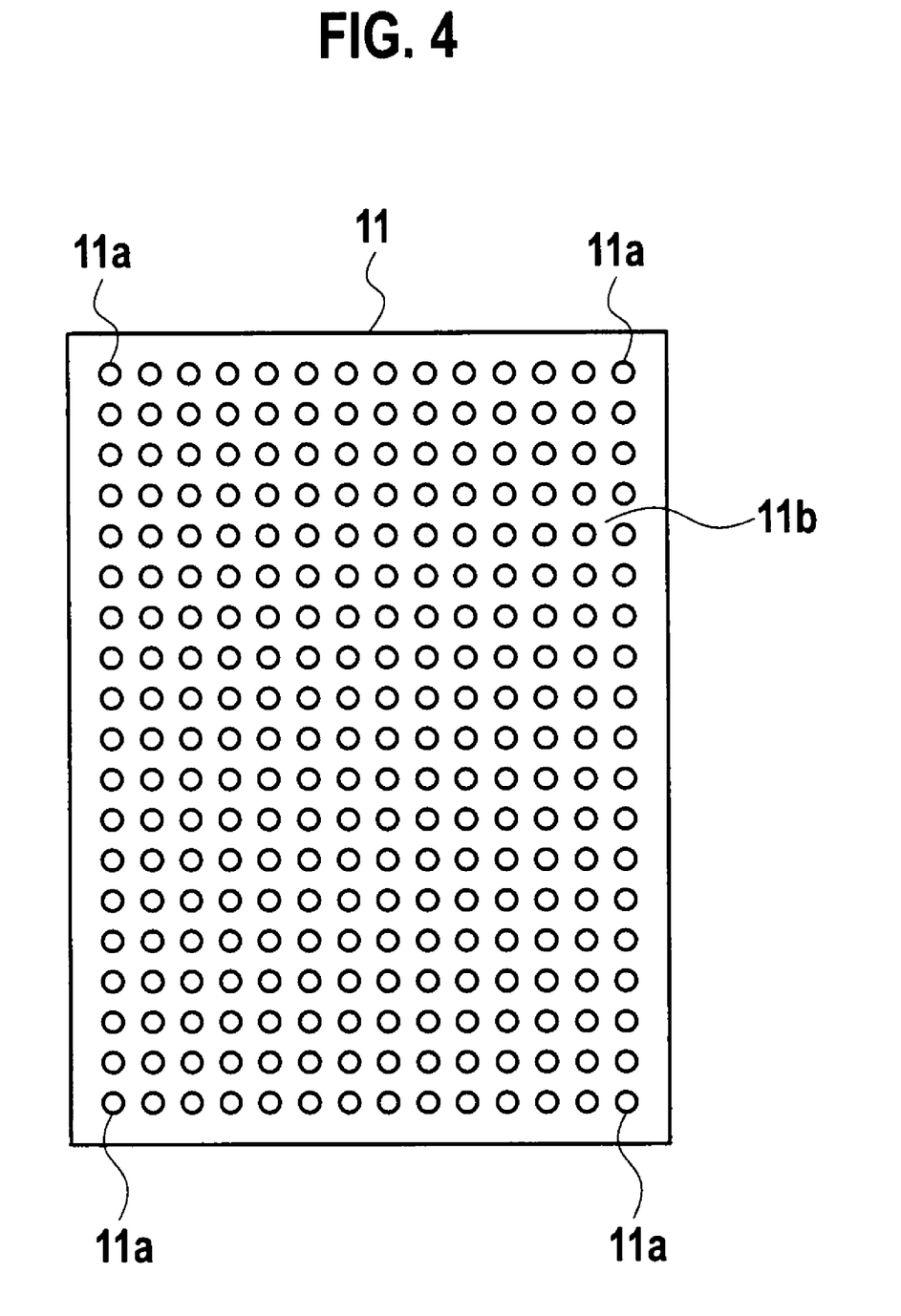
FIG. 4 is a plane view illustrating an example of a lyophilic porous body according to the second embodiment.

The lyophilic porous body 11 includes multiple through-holes 11a penetrating the lyophilic porous body 11 between a surface contacting the anode gas diffusion layer 4 and a surface contacting the anode passage plate 30. As shown in FIG. 4, the through-holes 11a are opened in a tessellated manner throughout the sheet-shaped lyophilic carbon porous body with a thickness of approximately 200 μm, which has pores each with a pore size of several micrometers. The through-holes 11a are sufficiently larger in diameter than the micro-pores each with a pore size of several micrometers, which constitute the lyophilic porous body 11. For example, the through-holes 11a can be set at approximately 1 mm in diameter. The pore sizes of the through-holes 11a can be changed whenever deemed necessary, depending on the width of the anode passage plate 30 and the like.

A carbon paper, carbon cloth or the like made of hydrophilically treated carbon fibers, which has fine pores each with a pore size of several micrometers, is used for the lyophilic porous body 11. Otherwise, a material obtained by hydrophilically treating a sintered metal having fine pores each with a pore size of several micrometers, or an electrically-conductive hydrophilic porous body material having pores each with a pore size of less than several micrometers can be used for the lyophilic porous body 11.

End portions of the gas collection passage 32 in the anode passage plate 30 shown in FIG. 3 are connected respectively to the through-holes 11a in the lyophilic porous body 11. The fuel supplying passage 31 is connected to parts (areas 11b in FIG. 4) of the lyophilic porous body 11 in which no through-holes 11a are formed. The other parts of the configuration are virtually the same as those of the fuel cell 100a shown in FIG. 1. Therefore, the repeated descriptions will be omitted.

Since the lyophilic porous body 11 is lyophilic, the fuel cell 100b shown in FIG. 3 holds, in the lyophilic porous body 11, the fuel supplied to the fuel supplying passage 31 by a liquid conveying pump 60 or the like. On the other hand, more of $CO_2$ which has been produced by anode reaction, and which is subsequently brought to the anode gas diffusion layer 4 are accommodated in the through-holes 11a rather than passes the lyophilic porous body 11, after $CO_2$ reaches the interface between the anode gas diffusion layer 4 and the lyophilic porous body 11. That is because $CO_2$ passes the through-holes 11a more easily than passes the inside of the lyophilic porous body 11 holding the liquid (fuel).

Furthermore, the fuel cell 100b is capable of checking $CO_2$ from being mixed into the fuel supplying passage 31 by collecting $CO_2$ passing the through-holes 11a in the lyophilic porous body 11 by use of the gas collection passage 32. Moreover, as shown in FIG. 3, the fuel cell 100b is capable of collecting $CO_2$ by use of a pneumatic conveying pump 70 provided in the gas collection passage 32. The fuel cell 100b is capable of discharging $CO_2$ with the $CO_2$ gas being separated from unreacted part of the liquid fuel, even if the MEA is tilted to an arbitrary direction. That is because the lyophilic porous body 11 is arranged in the fuel cell 100b.

Third Embodiment

Figure 5:
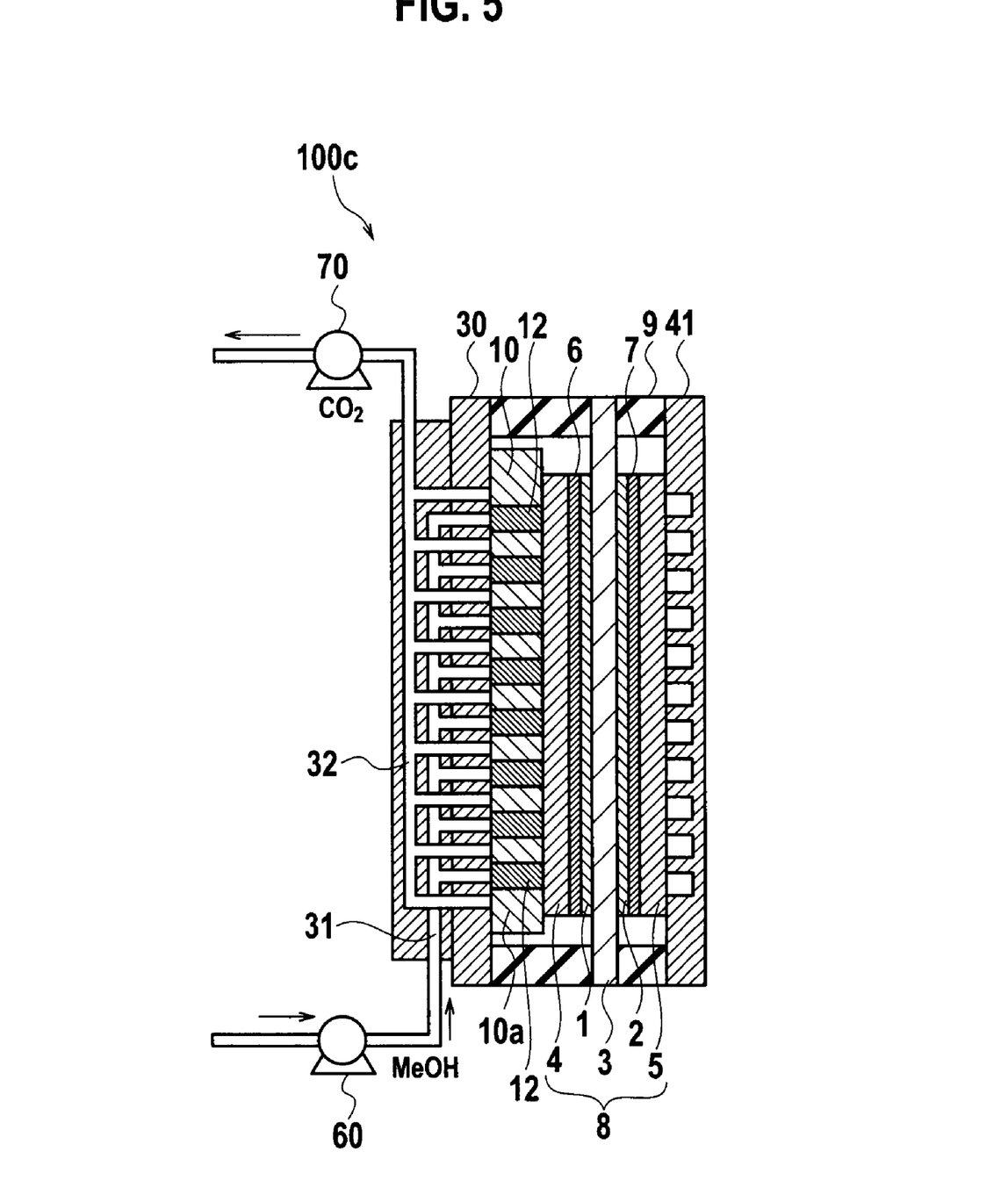
FIG. 5 is a sectional view illustrating an example of the fuel cell according to a third embodiment.

As shown in FIG. 5, in a case of a fuel cell 100c according to a third embodiment, lyophilic porous bodies 12 are respectively buried in the through-holes 10a in the lyophobic porous body 10.

A carbon paper or carbon cloth made of lyophilically treated carbon fibers, which has fine pores each with a pore size of several micrometers, a hydrophilic sintered metal having fine pores each with a pore size of several micrometers, or an electrically-conductive hydrophilic porous body material having pores each with a pore size of less than several micrometers can be used for the lyophilic porous bodies 12. Each material needs to be formed into a predetermined shape which allows the material to be buried into the lyophilic porous bodies 12. Otherwise, a material obtained by spraying a polymer containing sulfonate base to a part of a lyophobic porous body and lyophilically treating the resultant lyophobic porous body, may be used for the lyophilic porous bodies 12. The other parts of the configuration of the fuel cell 100c are virtually the same as those of the fuel cell 100a shown in FIG. 1. For this reason, the repeated descriptions will be omitted.

According to the fuel cell 100c shown in FIG. 5, the lyophilic porous bodies 12 are arranged in the respective through-holes 10a. Therefore, the fuel cell 100c is capable of easily holding the fuel in the lyophilic porous bodies 12, concurrently separating $CO_2$ from unreacted part of the fuel more stably, and accordingly operating stably.

Forth Embodiment

Figure 6:
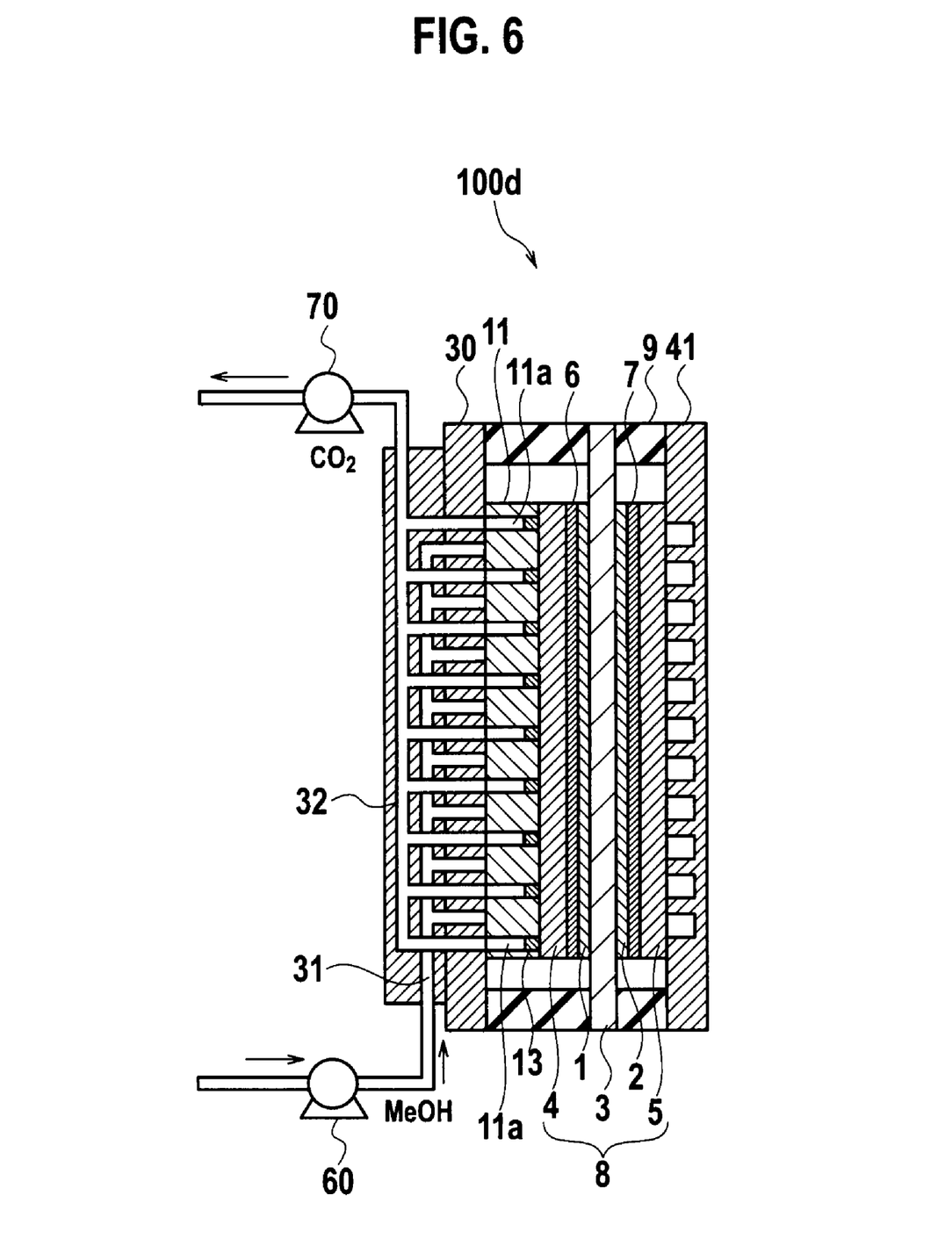
FIG. 6 is a sectional view illustrating an example of the fuel cell according to a fourth embodiment.

In the case of an fuel cell 100d according to a fourth embodiment, as shown in FIG. 6, a lyophobic porous body 13 is buried in at least a part of each of the through-holes 11a in the lyophilic porous body 11.

A carbon paper made of hydrophobically-treated carbon fibers, which has fine pores each with a pore size of several micrometers, a material obtained by hydrophobically treating a sintered metal, an electrically-conductive lyophobic porous body material having pores each with a pore size of less than several micrometers, or the like may be used as the lyophobic porous body 13. Each material needs to be formed into a predetermined shape which allows the material to be buried into the through-holes 11a. Otherwise, a material obtaining by lyophobically treating parts of the hydrophilic porous body 11 by coating them with a Nafion film (registered trademark) may be used as the lyophobic porous body 13.

In FIG. 6, the lyophobic porous bodies 13 are buried in the respective through-holes 11a. The lyophobic porous bodies 13 contact the surface on which the lyophilic porous body 11 and the anode gas diffusion layer 4 contact each other. However, the lyophobic porous bodies 13 may be buried fully into the respective through-holes 11a. Since the other parts of the configuration of the fuel cell 100d are substantially the same as those of the fuel cell 100b shown in FIG. 3, the repeated descriptions will be omitted.

The fuel cell 100d allows $CO_2$ in the anode gas diffusion layer 4 to permeate into the lyophobic porous body 13 more easily than a fuel cell with its through-holes 11a being hollowed.

Fifth Embodiment

Figure 7:
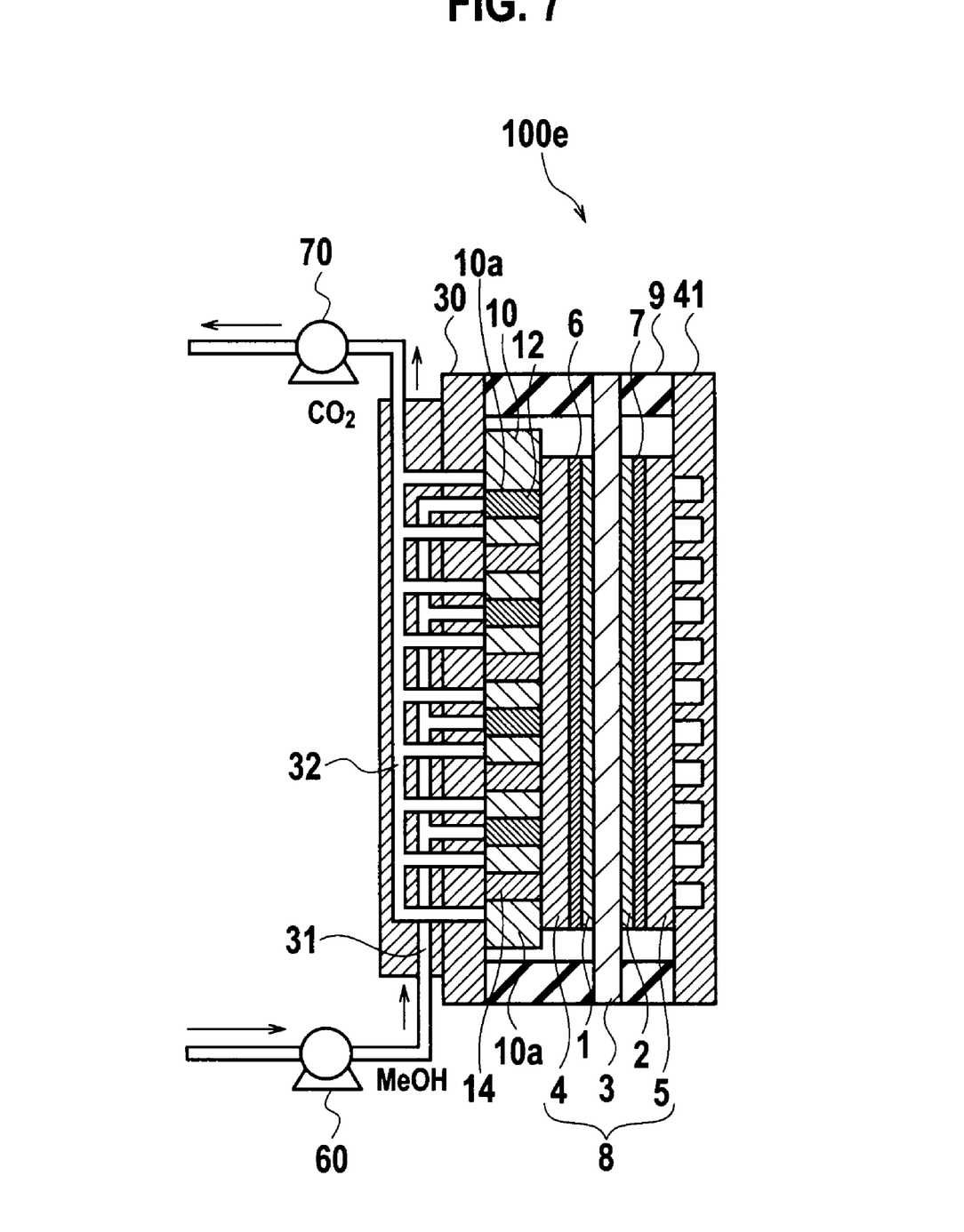
FIG. 7 is a sectional view illustrating an example of the fuel cell according to a fifth embodiment.

In the case of a fuel cell 100e according to a fifth embodiment, as shown in FIG. 7, the lyophilic porous bodies 12 are buried in the respective through-holes 10a in the lyophobic porous body 10. Furthermore, contacts 14 are buried respectively in parts of the lyophobic porous body 10 which contact neither the fuel supplying passage 31 nor the gas collection passage 32. The contacts 14 conducts electricity between the anode gas diffusion layer 4 and the anode passage plate 30.

In the case where the contacts 14 are arranged there, an electrically-nonconductive material made of expanded polytetrafluoroethylene (expanded PTFE) or the like which has pores each with a pore size of less than several micrometers may be used for the lyophobic porous body 10. In this case, it is desirable that a carbon or a metal should be used for the contacts 14. Moreover, the fuel can be supplied through interstices or lyophilic porous bodies 12 obtained by hydrophilically treating parts of expanded PTFE as the lyophobic porous body 10 or by opening through-holes in parts of expanded PTFE as the lyophobic porous body 10. The lyophilic porous bodies 12 are also obtained by opening through-holes in expanded PTFE as the lyophobic porous body 10 and subsequently filling the through-holes thus opened with the respective lyophilic porous bodies such as porous cellulose. The other parts of the configuration of the fuel cell 100e are substantially the same as those of the fuel cell 100a shown in FIG. 1. The repeated descriptions will be omitted.

The fuel cell 100e shown in FIG. 7 is capable of conducting electricity through the contacts 14 between the anode gas diffusion layer 4 and the anode passage plate 30, and accordingly generating electricity in a desirable manner, even if the lyophobic porous body 10 is a non-conductor or a high-resistance material through which electricity can hardly pass.

Sixth Embodiment

Figure 8:
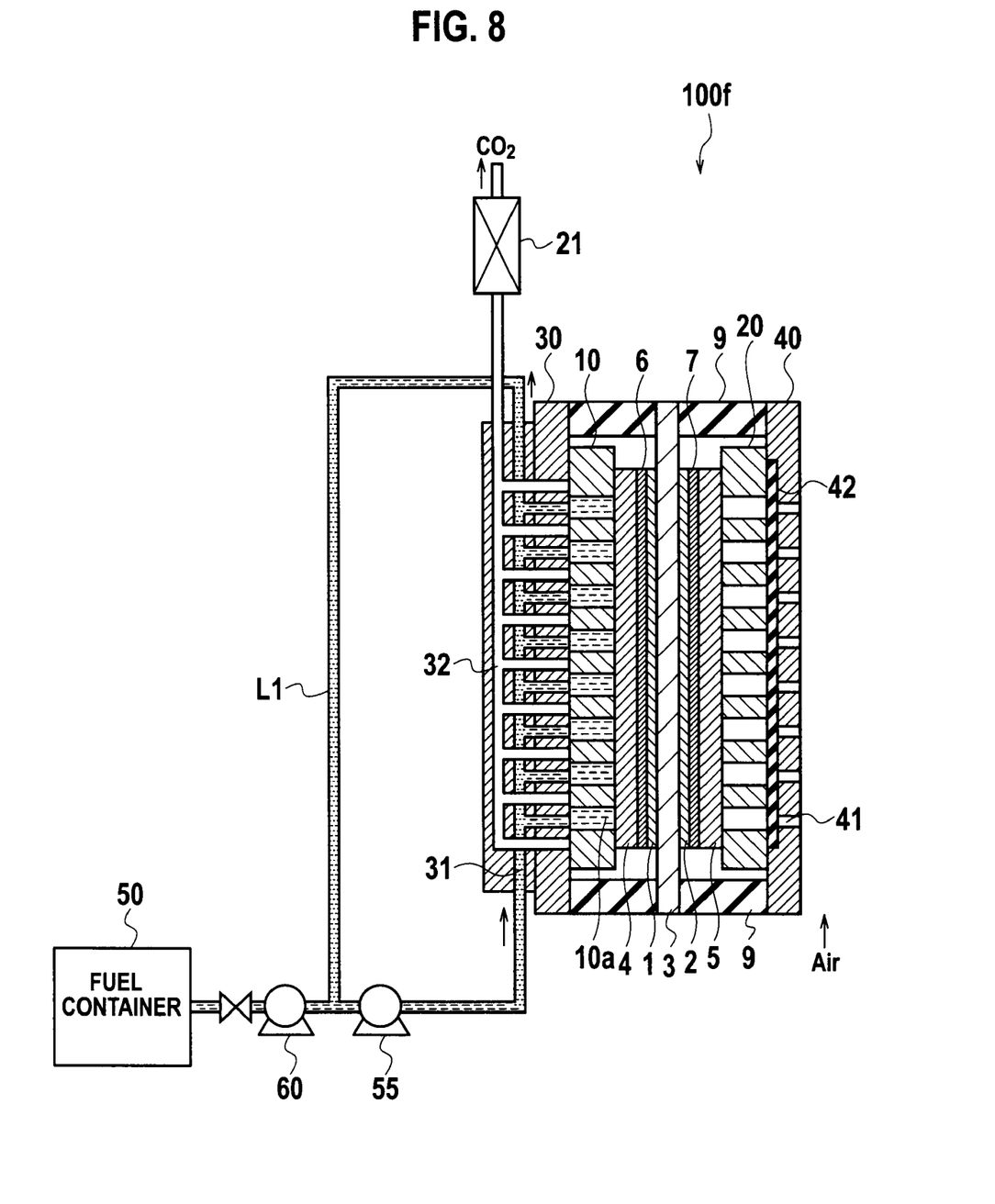
FIG. 8 is a sectional view illustrating an example of the fuel cell according to a sixth embodiment.

As shown in FIG. 8, a fuel cell 100f according to a sixth embodiment includes a circulation line L1 for collecting emission matters discharged from the anode passage plate 30 and subsequently circulate the exhaust matters to the fuel supplying passage 31. In addition, a chemical filter 42 for adsorbing impurities from the air may be arranged in the cathode passage plate 40.

The liquid conveying pump 60 is arranged at a location downstream of a fuel container 50 in which a high-concentration fuel such as ethanol are accommodated. A circulation pump 55 is arranged in a pipe at a location downstream of the liquid conveying pump 60. The circulation pump 55 re-supplies the fuel, which has been discharged from the outlet of the fuel supplying passage 31, to the inlet of the fuel supplying passage 31 via the circulation line L1.

Although it is not illustrated in FIG. 8, a mixing tank can be arranged in a pipe between the liquid conveying pump 60 and the circulation pump 55. The mixing tank prepares a methanol aqueous solution with a certain concentration by mixing the high-concentration fuel supplied from the fuel container 50 and the liquid supplied through the circulation line L1. A volatile-organic-compound (VOC) remover 21 is connected to a pipe at the outlet of the gas collection passage 32. The other parts of the configuration of the fuel cell 10 of are virtually the same as those of fuel cell 100a shown in FIG. 1. The repeated descriptions will be omitted.

The fuel cell 100f shown in FIG. 8 is capable of introducing $CO_2$, which has been discharged from the anode gas diffusion layer 4, to the gas collection passage 32 by use of the lyophobic body porous 10. Organic matters in minute amounts contained in $CO_2$ are removed by the VOC remover 21. The liquid is supplied to the circulation line L1 via the fuel supplying passage 31. As a result, almost no gas is contained in the fluid at the outlet of the fuel supplying passage 31. Accordingly, the fuel cell 100f is capable of reducing pressure loss in the passage. Moreover, the fuel cell 100f requires no gas-liquid separator to be additionally arranged in the pipe at the outlet of the fuel supplying passage 31, and the system is accordingly capable of being constructed in a compact size.

The liquid conveying pump 60 can be omitted. Almost no gas enters the fuel supplying passage 31 and the circulation line L1. Part of the liquid consumed at the anode of the MEA 8 or part of the liquid permeating into the cathode decreases in volume. As long as the pipe connected to the fuel container is filled with the liquid, part of the liquid with a volume corresponding to the volume of the part of the liquid decreased at the anode is automatically replenished from the fuel container.

Seventh Embodiment

Figure 9:
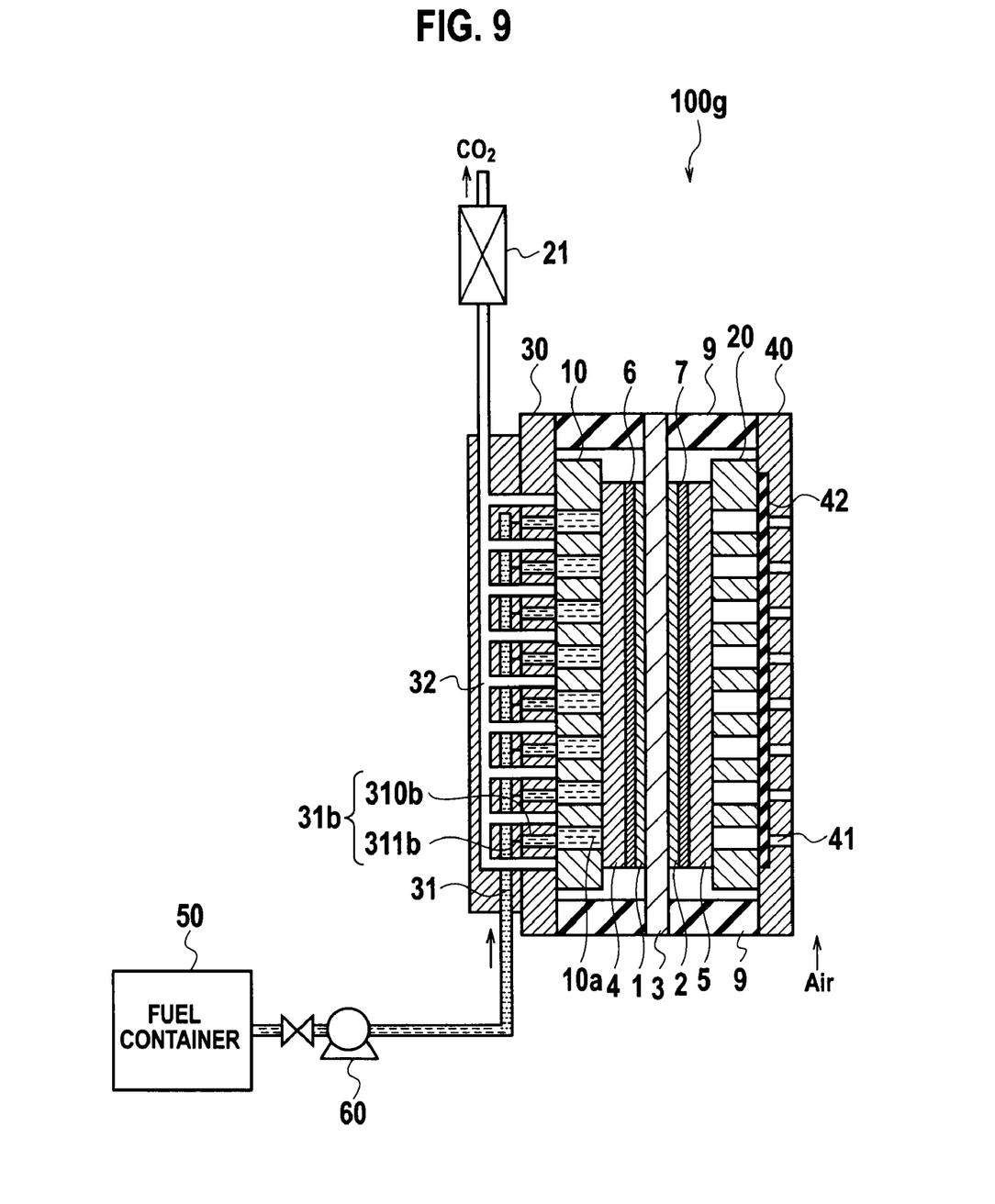
FIG. 9 is a sectional view illustrating an example of the fuel cell according to a seventh embodiment.

In the case of a fuel cell 100g according to a seventh embodiment, as shown in FIG. 9, the supplying section 31b in the fuel supplying passage 31 includes: first passages 310b connected to the respective through-holes 10a; and second passages 311b which are connected respectively to upstream locations of the first passages 310b. Fluid diffusion resistances of the second passages 311b are larger than those of the first passage 310b. The fluid diffusion resistances of the second passages 311b can be made larger than those of the first passages 310b by providing fine pores or pipe to part of each of the second passages 311b.

Passages usable as the second passages 311b have diffusion resistances which are set larger than those of the first passages 310b when the fluid passes the first and second passages 310b and 311b. The second passages 311b are designed by arranging in the second passages 311b pipes which are smaller in diameter than those of the first passages 310b, by arranging plates having fine pores in the second passages 311b, or by doing an equivalent thing. An amount of the fuel supplied to the first passages 310b from the fuel supplying passage 31 via the second passages 311b for a unit time is designed to balance out a total amount of methanol and water which are consumed and permeate in the MEA 8.

The liquid conveying pump 60 is arranged at a location downstream of the fuel container 50 in which the high-concentrated fuel such as methanol is accommodated. The fuel supplied via the liquid conveying pump 60 flows to the second passages 311b and the first passages 310b through the fuel supplying passage 31. Subsequently, the liquid flows to the anode gas diffusion layer 4 through the through-holes 10a in the lyophobic porous body 10. $CO_2$ produced by anode reaction passes non-porous parts of the lyophobic porous body 10. The $CO_2$ then introduces from the anode gas diffusion layer 4 to the VOC remover 21 via the gas collection passage 32. Organic matters contained in minute amounts in $CO_2$ are removed by the VOC remover 21. The other parts of the configuration of the fuel cell 100g are virtually the same as those of the fuel cell 100a shown in FIG. 1. The repeated descriptions will be omitted.

In the case of the fuel cell 100g shown in FIG. 9, the flow rate in the second passage 311b is accelerated to an extent of preventing water from back-diffusing, since the fuel is supplied to the first passages 310b via the second passage 311b. As a result, the fuel upstream of the second passages 311b is not diluted. This enables the fuel cell 100g to generate electricity stably. Furthermore, the fuel need not be circulated for the purpose of supplying the fuel. This makes it possible to construct the fuel circulation section in a compact size, and to reduce power consumption in the accessories.

Eighth Embodiment

Figure 10:
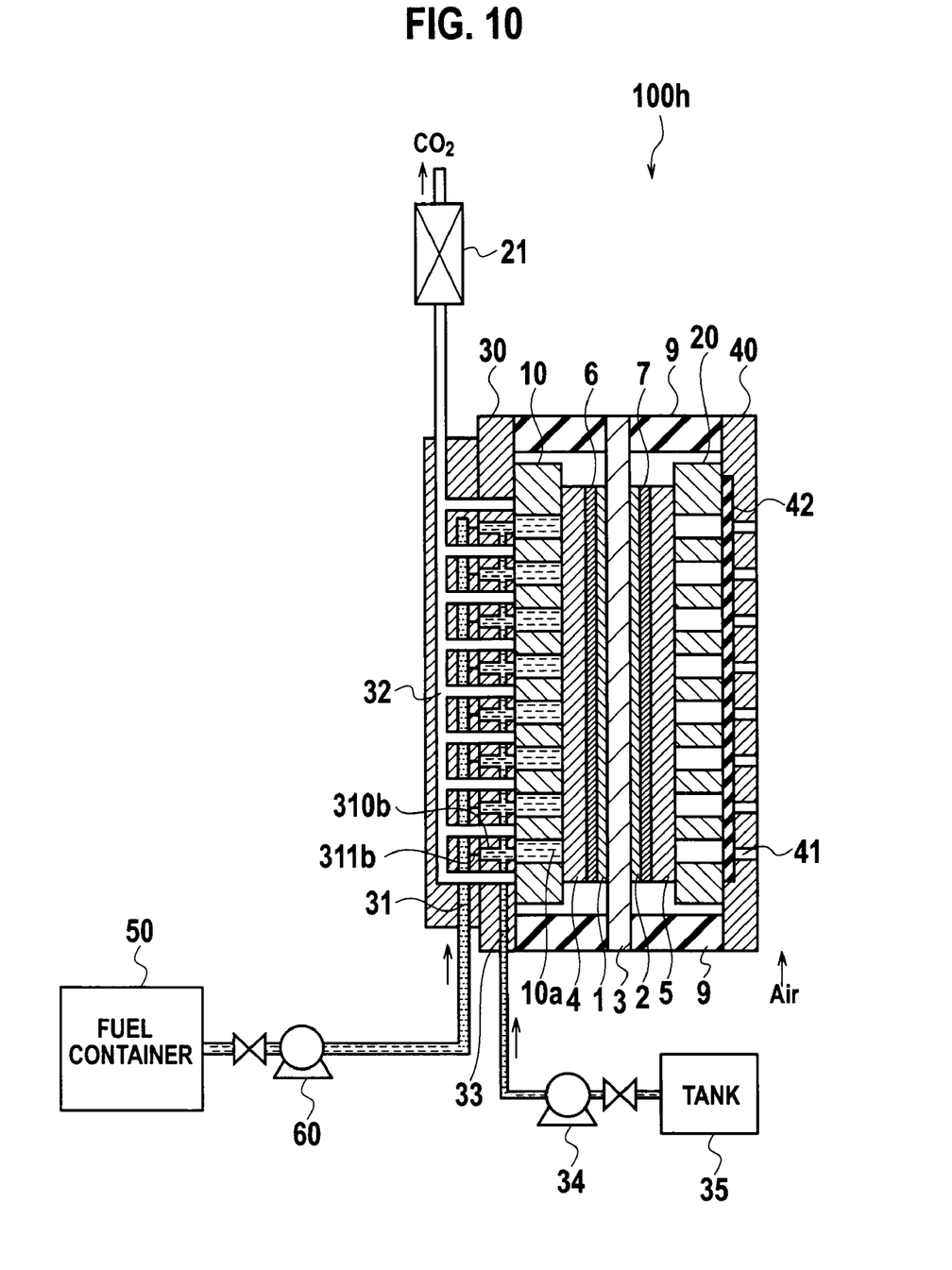
FIG. 10 is a sectional view illustrating an example of the fuel cell according to an eighth embodiment.

In the case of a fuel cell 100h according to an eighth embodiment, as shown in FIG. 10, the branching passage 33 is connected to the first passage 310b.

The branching passage 33 is connected to each of the first passages 310b connected respectively to the multiple through-holes 10a. A pump 34 for pumping the fuel in the first passages 310b out to the outside of the fuel cell 100h and a tank 35 for accommodating the fuel pumped out by the pump 34 are connected to the branching passage 33. The other parts of the configuration of the fuel cell 100h are virtually the same as those of the fuel cell 100g shown in FIG. 9.

When the fuel cell 100g shown in FIG. 9 stops generating electricity, part of the fuel remains in the first passages 310b. This is because the second passages 311b whose fluid diffusion resistances are larger than those of the first passages 310b are arranged in the fuel cell 110g. The part of the fuel remaining in the first passages 310b moves to the cathode catalyst layer 2 by diffusion or the like. This decreases the fuel concentration in the anode catalyst layer 1. Once the fuel concentration decreases in the anode catalyst layer 1, the fuel can not be supplied to the anode fully in some cases when the fuel cell 100g resumes its operation, no matter how much of the fuel may be supplied by the liquid conveying pump 60. That is because the liquid is consumed at the anode in the MEA 8 in an extremely small amount. In these cases, the diluted part of the fuel is sucked to the passage 31 by reversely rotating the liquid conveying pump 60, and is thus mixed with the high-concentration fuel. Thereafter, the fuel thus mixed is supplied to the first passages 310b and the through-holes 100a by the liquid conveying pump 60. Thereby, the fuel cell 100g is capable of resuming generating electricity. Nevertheless, it is likely that the high-concentration fuel may contact the MEA 8 when the fuel cell 100g is activated.

In contrast, when the liquid conveying pump 60 is stopped and the fuel cell 100h stops generating electricity, the fuel cell 100h shown in FIG. 10 pumps out the fuel from the first passages 310b to the tank 35 via the branching passage 33 by use of a pump 34, and thus accommodates the fuel in the tank 35. As a result, there is no liquid left in the first passages 310b and the through-holes 10a. When the fuel cell 100h is going to resume generating electricity, the low-concentration fuel which has been accommodated in the tank 35 is supplied into the first passages 310b and the through-holes 10a by the pump 34. This scheme enables the fuel cell 100h to resume generating electricity. In addition, this makes it less likely that the high-concentrated fuel may contact the MEA 8 when the fuel cell 100h is activated.

It should be noted that, when the fuel cell 100h is going to resume generating electricity, the fuel cell 100h fills the first passages 310b and the through-holes 10a with the low-concentration fuel. Thereafter the fuel cell 100h supplies the high-concentration fuel to the fuel supplying passage 31 by use of the liquid conveying pump 60.

The configuration with which the branching passage of this type is provided to the fuel cell may be applied, for example, to the configuration for circulating the fuel as shown in FIG. 8.

(Examples of Fuel Cell Arrangement)

Figure 11:
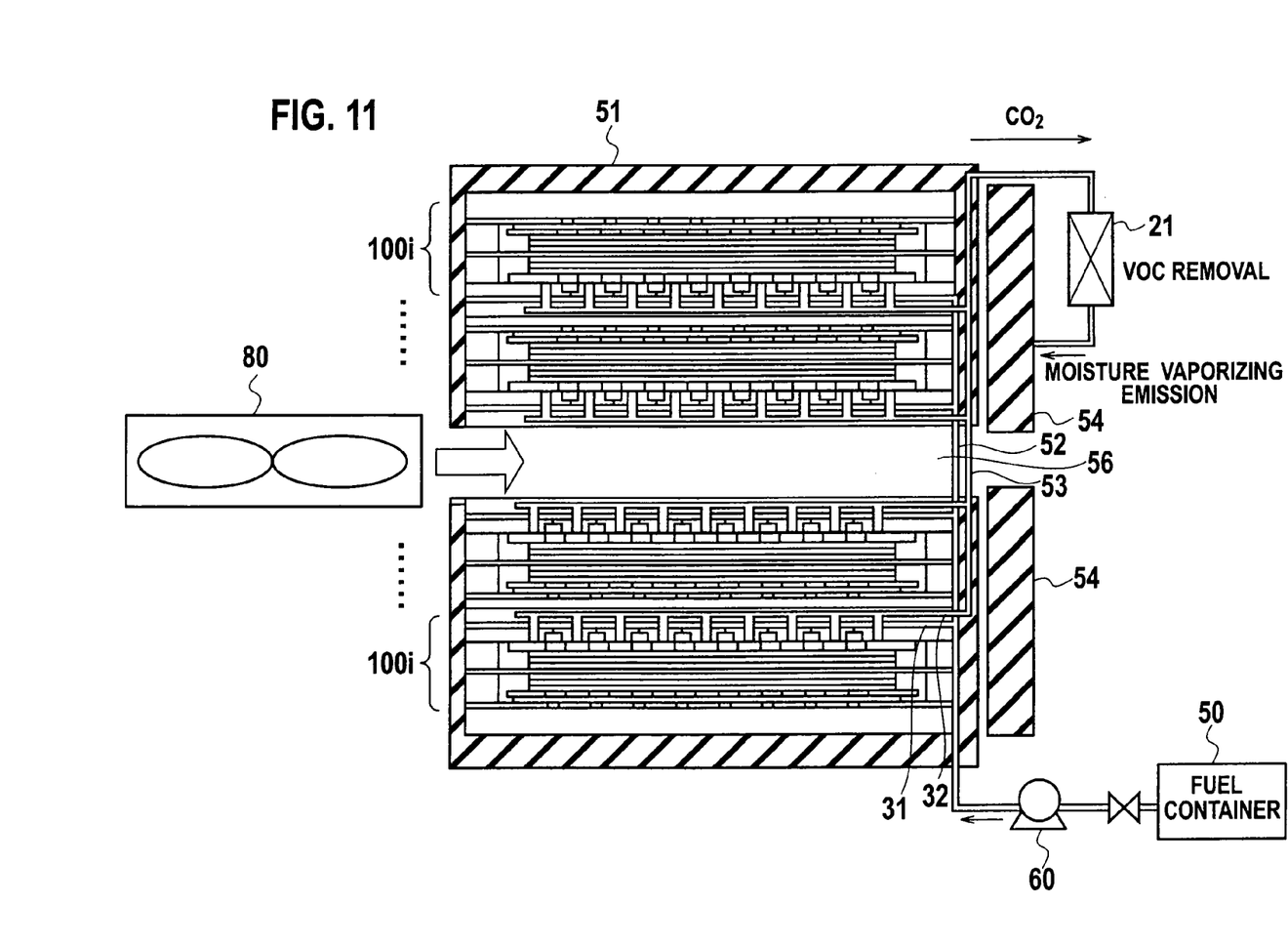
FIG. 11 is a conception diagram illustrating an example of fuel cells according to the first to eighth embodiments are arranged.
Figure 12:
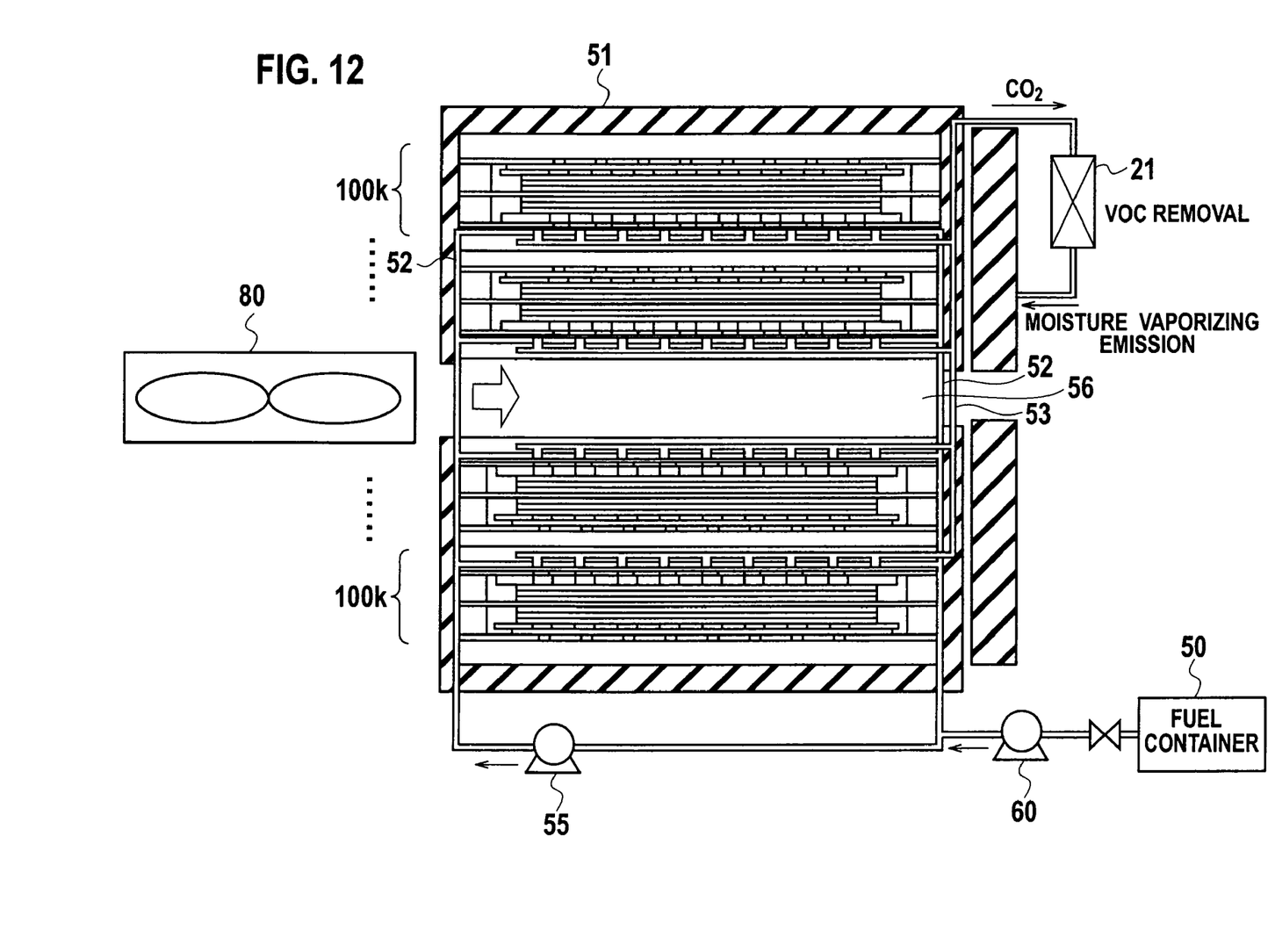
FIG. 12 is another conception diagram illustrating an example of fuel cells according to the first to eighth embodiments are arranged.

FIGS. 11 and 12 show conceptual diagrams illustrating how multiple fuel cells are arranged when the fuel cells are stacked one on another with regard to each type of the fuel cells 100a to 100h according to the first to eighth embodiments.

As shown in FIG. 11, for example, multiple fuel cells 100i are stacked one on another inside an accommodation section 51. A space section 56 to which a large amount of air is conveyed from the outside of the accommodation section 51 by use of a fan 80 or the like is provided in the middle of the accommodation section 51. The anodes respectively of the two adjacent fuel cells 100i between which the space section 56 is interposed are set opposite to each other in the space section 56. In other words, in FIG. 11, the fuel cells 100i stacked one on another above the space section 56 are arranged with their anodes facing downward, whereas the fuel cells 100i stacked one on another under the space section 56 are arranged with their anodes facing upward. The cathodes of the fuel cells 100i are designed to be supplied with the air by breathing.

The fuel supplied from the fuel container 50 is pumped out by the liquid conveying pump 60. The fuel is then supplied to the fuel supplying passages respectively of the fuel cells 100i via a pipe 52 provided to the inside of the accommodation section 51. $CO_2$ produced in each of the fuel cells 100i is conveyed to the outside of the accommodation section 51 via a pipe 53 in the accommodation section 51. Organic matters or the like contained in $CO_2$ thus conveyed are removed from $CO_2$ by the VOC remover 21. Water conveyed along with $CO_2$ is absorbed in an absorber 54 such as a sponge, and is thus evaporated and emitted.

FIG. 12 is a conceptual diagram illustrating an example of how the fuel cells 100 are arranged when the fuel once supplied to the fuel supplying passages is reused through the circulation. As in the case of the arrangement shown in FIG. 11, multiple fuel cells look are stacked one on another. The fuel supplying passages respectively of the fuel cells 100k are connected to the pipe 52 provided to the accommodation section 51.

The fuel supplied from the fuel container 50 is pumped out by the liquid conveying pump 60, and is thus supplied to the fuel supplying passages respectively of the fuel cells 100i via the pipe 52 provided inside the accommodation section 51. The fluid discharged from the fuel cells 100i is pumped away by the pump 55, and is thus re-supplied to the pipe 52 inside the accommodation section 51.

On the other hand, $CO_2$ produced in each of the fuel cells 100i is conveyed to the outside of the accommodation section 51 via the pipe 53 in the accommodation section 51. Organic matters and the like contained in $CO_2$ are removed from $CO_2$ by the VOC remover 21. Water conveyed along with $CO_2$ after $CO_2$ is removed from water is absorbed in the absorber 54 such as a sponge, and is thus evaporated and emitted.

The examples shown in FIGS. 11 and 12 are capable of generating electricity in a desirable condition while keeping the temperature of the cell stack constant. This is because the anodes of parts of the fuel cells 100i and look are cooled by supplying the air to the fuel cells from the outside through the space section 56 by use of the fan 80. Although an illustration of the specific configuration is omitted from the conceptual diagrams shown in FIGS. 11 and 12, the air is supplied to the cathodes by breathing instead of being conveyed to the cathodes by use of the fan 80.

The present invention has been described showing the examples of how the lyophilic and lyophobic porous bodies are used. The words "lyophilic" and "lyophobic" have been used in a way that "lyophilic" indicates that the body tends to absorb a methanol aqueous solution whereas "lyophobic" indicates that the body will never absorb a methanol aqueous solution. Furthermore, the present invention has been described showing: the fuel cells 100c shown in FIG. 5, where the lyophilic porous bodies 12 are buried in the through-holes 10a; the fuel cells 100d shown in FIG. 6, where the lyophobic porous bodies 13 are buried in the through-holes 11a; and the fuel cells 100e shown in FIG. 7, where the lyophilic porous bodies 12 are buried in the through-holes 11a. Nevertheless, it goes without saying that the fuel cell 100c with no through-holes 10a being opened as well as the fuel cells 100d and 100e each with no through-holes 11a being opened is capable of bringing about the same working effect as the fuel cell 100c having the through-holes 10a as well as the fuel cells 100d and 100e each having the through-holes 11a. The same working effect can be brought about by lyophilically (hydrophilically) treating part of each of the lyophobic porous bodies 10, and by lyophobically (hydrophobicly) treating part of each of the lyophilic porous bodies Additionally, it goes without saying that configurations of the first passages 310b, the second passages 311b, the branching passage 3, the pump 34 and the tank 35, as shown in FIG. 9 and FIG. 10, can be applicable to configurations of the fuel supplying passages 31 shown in FIG. 3a and FIG. 6.

Various modifications will become possible for those skilled in the art after receiving the teachings of the present disclosure without departing from the scope thereof.

What is claimed is:

1. A fuel cell comprising:
    a membrane electrode assembly including an anode, a cathode opposed to the anode, and an electrolyte membrane interposed between the anode and the cathode;
    a lyophobic porous body in contact with the anode; and
    an anode passage plate in contact with the lyophobic porous body, the anode passage plate including a gas collection passage and a fuel supplying passage, the gas collection passage collects a gas generated in the anode via the lyophobic porous body, the fuel supplying passage supplies a fuel to the anode via the lyophobic porous body,
    wherein the fuel supplying passage further includes
    a plurality of first passages in contact with the lyophobic porous body; and
    a plurality of second passages respectively connected to an upstream side of the first passages, and fluid diffusion resistances of the second passages are larger than fluid diffusion resistances of the first passages.

2. The fuel cell according to claim 1, wherein the lyophobic porous body includes a plurality of through-holes respectively connected to the fuel supplying passage.

3. The fuel cell according to claim 2, further comprising a plurality of lyophilic porous bodies buried in the through-holes.

4. The fuel cell according to claim 1, further comprising a plurality of contacts buried in the lyophobic porous body.

5. The fuel cell according to claim 1, further comprising:
    a branching passage connected to the first passages;
    a tank which accommodates a fuel in the first passages; and
    a pump which pumps the fuel in the first passages to the tank via the branching passage, or pumps the fuel in the tank to the first passages via the branching passage.

6. The fuel cell according to claim 1, further comprising a cathode passage plate opposed to the anode passage plate, wherein an oxidant is supplied to the cathode via the cathode passage plate.

7. The fuel cell according to claim 1, further comprising a circulation member which circulates an exhaust matter discharged from an outlet side passage of the fuel supplying passage to an inlet side passage of the fuel supplying passage.

8. A fuel cell comprising:
    a membrane electrode assembly including an anode, a cathode opposed to the anode, and an electrolyte membrane interposed between the anode and the cathode;
    a lyophilic porous body in contact with the anode; and
    an anode passage plate in contact with the lyophilic porous body, the anode passage plate including a gas collection passage and a fuel supplying passage, the gas collection passage collects a gas generated in the anode via the lyophilic porous body, the fuel supplying passage supplies a fuel to the anode via the lyophilic porous body,
    wherein the fuel supplying passage further includes
    a plurality of first passages in contact with the lyophobic porous body; and
    a plurality of second passages respectively connected to an upstream side of the first passages, and fluid diffusion resistances of the second passages are larger than fluid diffusion resistances of the first passages.

9. The fuel cell according to claim 8, wherein the lyophilic porous body includes a plurality of through-holes connected to the gas collection passage.

10. The fuel cell according to claim 9, further comprising a plurality of lyophobic porous bodies buried in the through-holes and in contact with the lyophilic porous body.

11. The fuel cell according to claim 8, further comprising a plurality of contacts buried in the lyophilic porous body.

12. The fuel cell according to claim 8, further comprising:
    a branching passage connected to the first passages;
    a tank which accommodates a fuel in the first passages; and
    a pump which conveys the fuel in the first passages to the tank via the branching passage, or conveys the fuel in the tank to the first passages via the branching passage.

13. The fuel cell according to claim 8, further comprising a cathode passage plate opposed to the anode passage plate, wherein an oxidant is supplied to the cathode via the cathode passage plate.

14. The fuel cell according to claim 8, further comprising a circulation member which circulates an exhaust matter to an inlet side passage of the fuel supplying passage, wherein the exhaust matter is discharged from an outlet side passage of the fuel supplying passage.

* * * * *